US00RE41296E

(19) United States
(12) Reissued Patent
Hu

(10) Patent Number: US RE41,296 E
(45) Date of Reissued Patent: May 4, 2010

(54) RETAINER RING FOR SECURELY RETAINING A FIRST OBJECT TO A SECOND OBJECT

(76) Inventor: Bobby Hu, 8F, No. 536-1, Ta Chin Street, Taichung (TW)

(21) Appl. No.: 11/356,420

(22) Filed: Feb. 16, 2006

Related U.S. Patent Documents

Reissue of:
(64) Patent No.: 6,691,593
Issued: Feb. 17, 2004
Appl. No.: 10/094,342
Filed: Mar. 8, 2002

(30) Foreign Application Priority Data

Nov. 28, 2001 (TW) ..... 90220753 U

(51) Int. Cl.
*B25B 13/46* (2006.01)
*A44B 21/00* (2006.01)

(52) U.S. Cl. ..... 81/60; 24/673; 24/675; 24/676; 403/DIG. 7

(58) Field of Classification Search ..... 81/60–63.2, 81/DIG. 11, 185; 24/546–547, 555–558, 24/561, 564, 566, 673–678; 403/DIG. 7; 299/107, 109
See application file for complete search history.

(56) References Cited

U.S. PATENT DOCUMENTS 4,324,158 A * 4/1982 Le Roy ..... 81/60
4,480,511 A * 11/1984 Nickipuck ..... 81/124.6
4,545,627 A * 10/1985 Nakamura et al. ..... 384/585
4,734,001 A * 3/1988 Bennett ..... 411/119
4,818,166 A 4/1989 Szukay et al.
5,067,775 A * 11/1991 D'Angelo ..... 299/104
5,295,422 A * 3/1994 Chow ..... 81/124.3
5,628,549 A * 5/1997 Ritchey et al. ..... 299/104
5,918,512 A * 7/1999 Habermehl et al. ..... 81/438
5,975,186 A * 11/1999 Day ..... 160/321
6,305,255 B1 * 10/2001 Wu ..... 81/439
6,691,593 B2 * 2/2004 Hu ..... 81/60

FOREIGN PATENT DOCUMENTS

| | | | |
|---|---|---|---|
| DE | 801 353 | | 11/1950 |
| DE | 91 09 843 | U | 11/1991 |
| DE | 297 08 764 | U1 | 7/1997 |
| DE | 297 14 390 | U1 | 6/1998 |
| EP | 0 498 206 | A1 | 8/1992 |
| JP | 10148208 | * | 2/1998 |
| TW | 433146 | | 5/2001 |
| TW | 45 8024 | | 10/2001 |
| WO | WO 97/25539 | * | 7/1997 |

OTHER PUBLICATIONS

Machine Design, "Simple Retaining Ring Variations Fill Special Needs" springs labeled "HO", "HOI", "E", and "RE", p. 128, Nov. 10, 1988.*

* cited by examiner

*Primary Examiner*—D. S Meislin

(57) ABSTRACT

A retainer ring includes at least two holding sections and at least one engaging section. Each holding section has a radius of curvature equal to half of a diameter of a reduced section of a first object, e.g., an adaptor. The engaging section has a radius of curvature greater than that of the holding sections. The holding sections securely clamp the reduced section of the first object with the engaging section partially protruding out of the reduced section of the first object for engaging with a second object e.g., a box end of a wrench.

94 Claims, 15 Drawing Sheets

RETAINER RING FOR SECURELY RETAINING A FIRST OBJECT TO A SECOND OBJECT

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue application of U.S. Pat. No. 6,691,593, issued Feb. 17, 2004, and filed on Mar. 8, 2002, with application Ser. No. 10/094,342, and claims priority from Taiwanese Patent Application No. 90220753 U, filed Nov. 28, 2001.*

BACKGROUND OF THE INVENTION

1. Field of the Invention

The present invention relates to a retainer ring for securely retaining a first object, e.g., an adaptor or a bit, to a second object, e.g., a box end of a wrench or a shank of a screwdriver.

2. Description of the Related Art

FIG. 12A of the drawings illustrates a conventional retainer ring 1 engaged in an annular groove 3 of an object 2, e.g., an adaptor. After mounting on the object 2, the retainer ring 1 could move to a position shown in FIG. 12B under the action of gravity. This is because there is no means for securely retaining retainer ring 1 in the annular groove 3. As a result, as illustrated in FIG. 13, it would be impossible to mount the object 2 into a receiving compartment 4 of, e.g., a box end of a wrench, as the retainer ring 1 protrudes too much outward to be inserted into the receiving compartment 4.

SUMMARY OF THE INVENTION

An object of the present invention is to provide a retainer ring for securely retaining a first object to a second object.

In an embodiment of the invention, the first object is an adaptor and the second object is a box end of a wrench. In another embodiment of the invention, the first object is a bit and the second object is a shank of a screwdriver.

A retainer ring in accordance with the present invention comprises at least two holding sections and at least one engaging section. Each holding section has a radius of curvature equal to a [diameter] *radius* of a reduced section of a first object. The engaging section has a radius of curvature greater than that of the holding sections. The holding sections securely clamp the reduced section of the first object with the engaging section partially protruding out of the reduced section of the first object for engaging with a second object.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
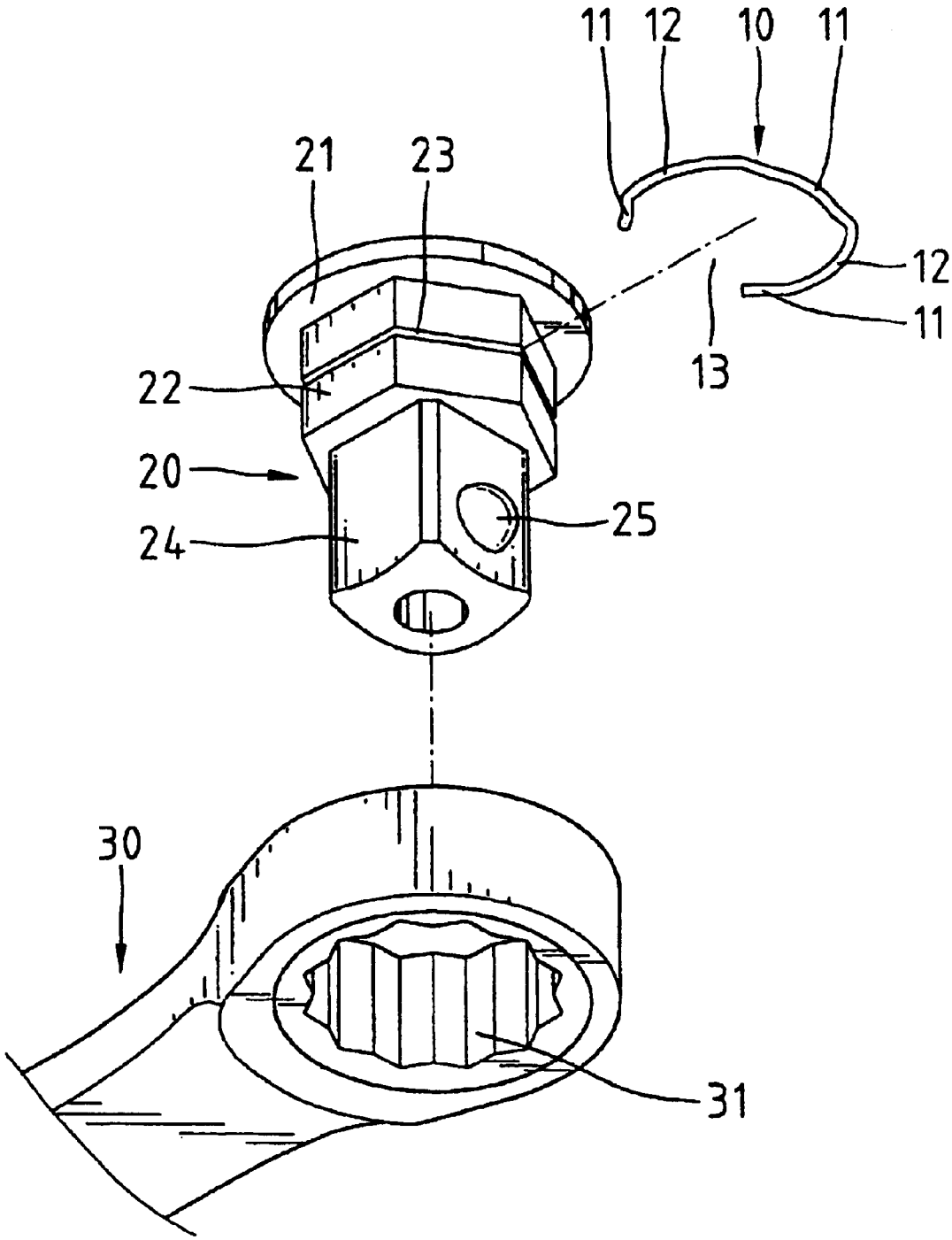
FIG. 1 is an exploded perspective view of a wrench, an adaptor, and a retainer ring in accordance with the present invention.

Referring to FIG. 1, in accordance with the present invention, a retainer ring 10 is provided to securely retain a first object, e.g., an adaptor 20 to a second object, e.g., a box end of a wrench 30. The adaptor 20 includes a first end 21 engaged in a receiving compartment 31 of the box end of a wrench 30 and a second end 24 that acts as a drive end for engaging with and driving a socket (not shown). A spring-biased ball 25 is mounted to the drive end 24 of the adaptor 20 for releasably engaging with the socket, which is conventional and therefore not described in detail. The first end 21 of the adaptor 20 includes a hexagonal engaging portion 22 with a reduced section in which an annular groove 23 is defined.

Figure 1A:
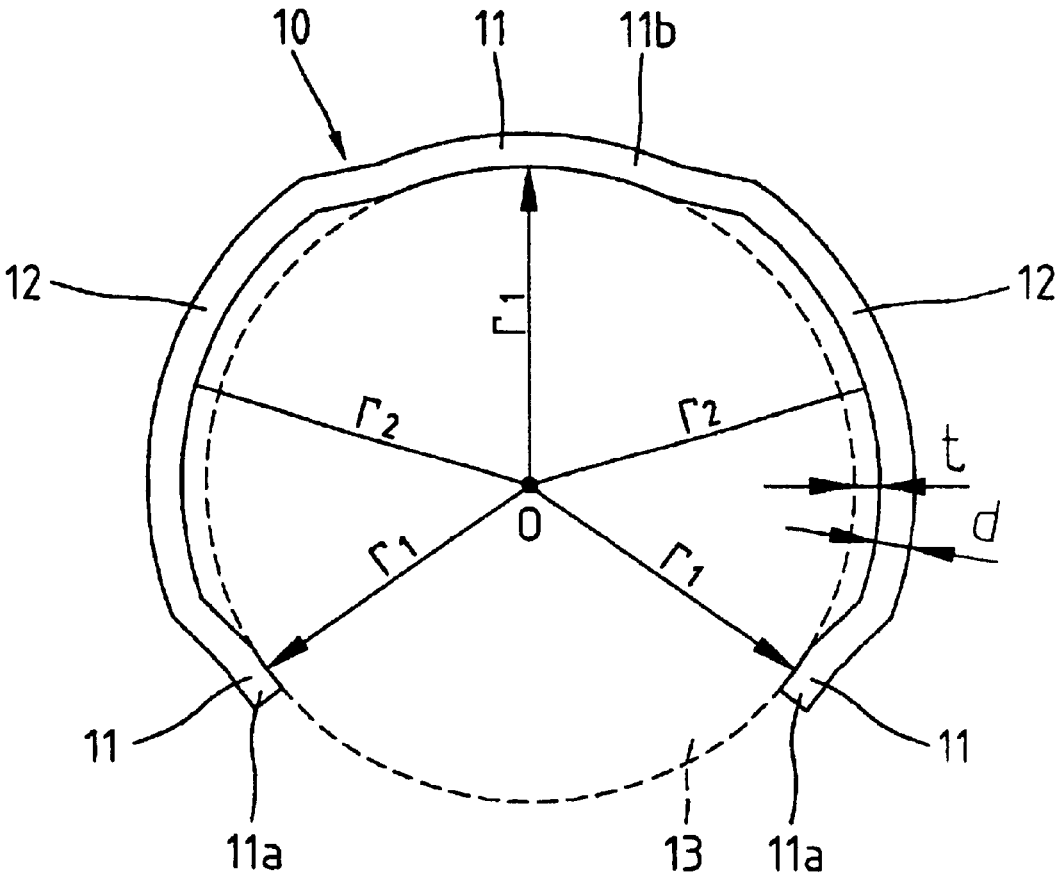
FIG. 1A is a plan view of the retainer ring in accordance with the present invention.
Figure 2:
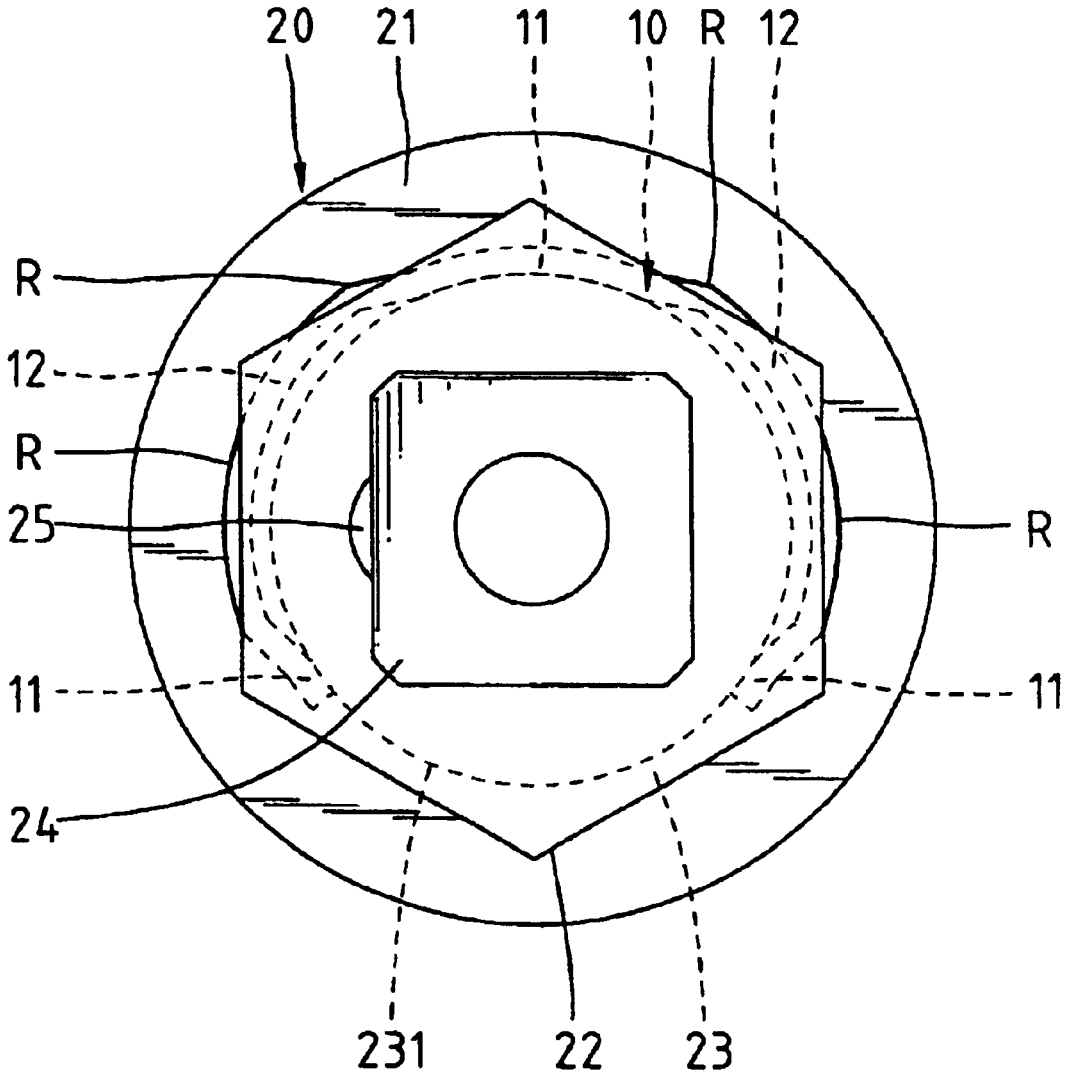
FIG. 2 is a bottom view of the adaptor and the retainer ring in an assembled state.

Referring to FIG. 1A, the retainer ring 10 is resilient and includes at least two radially inward holding sections 11 and at least one radially outward engaging section 12. Namely, the engaging section 12 is located in a position radially outward of the holding sections 11. In this embodiment, the retainer ring 10 includes three holding sections 11 located on two distal ends 11a of the retainer ring 10 and a section 11b of the retainer ring 10 opposite to an opening 13 of the retainer ring 10 between the distal ends 11a. As illustrated in FIG. 1A, each holding section 11 has a radius of curvature $r_1$ *from a center 0* equal to half of a diameter of the annular groove 23 defined in the reduced section of the engaging portion 22. Further, the retainer ring 10 includes two engaging sections 12 on both sides of the section 11b opposite to the opening 13 of the retainer ring 10. Each engaging section 12 has a radius of curvature $r_2$ greater than the radius of curvature $r_1$ of the holding sections 11. Preferably, the retainer ring 10 has a uniform thickness d. Preferably, the radius of curvature $r_2$ of the engaging sections 12 is greater than the radius of curvature $r_1$ of the holding sections 11 by an amount t less than a thickness d of the retainer ring 10.

Thus, when the retainer ring 10 is mounted in the annular groove 23 of the adaptor 20, the holding sections 11 of the retainer ring 10 securely clamp a bottom wall 231 defining the annular groove 23. Thus, the retainer ring 10 is securely engaged in the annular groove 23 of the adaptor 20 without the risk of relative movement therebetween. This is owing to the fact that each holding section 11 has a radius of curvature $r_1$ equal to half of a diameter of the reduced section of the engaging portion 22. Each engaging section 12 of the retainer ring 10 protrudes beyond the annular groove 23 of the adaptor 20 (see the solid black lines R and the dashed lines between the solid black lines R).

Figure 3:
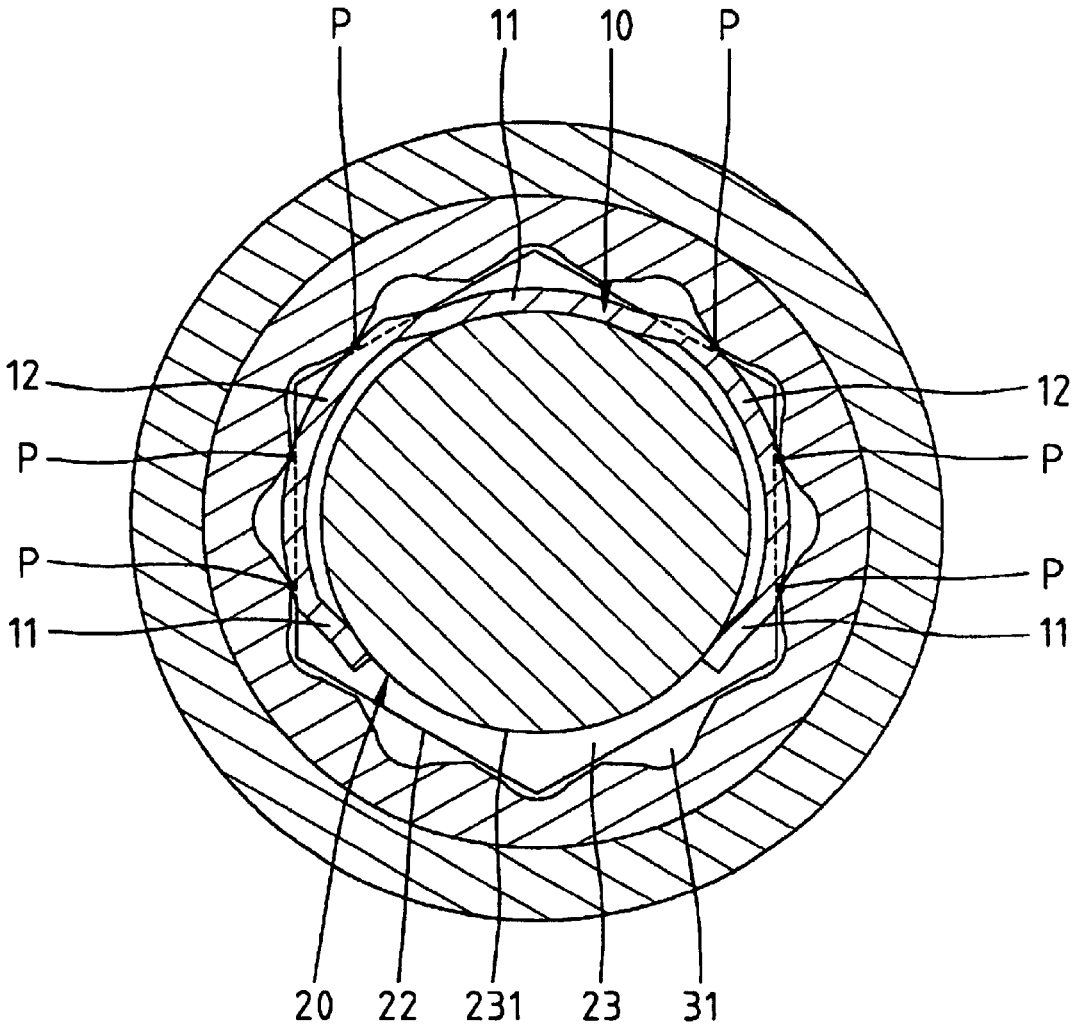
FIG. 3 is a sectional view of an end of the wrench, the adaptor, and the retainer ring in FIG. 2.

Referring to FIG. 3, when the adaptor 20 coupled with the retainer ring 10 is mounted in a dodecagonal receiving compartment 31 of a wrench 30, the retainer ring 10, when compressed, would not move or wobble in the annular groove 23 of the adaptor 20, as the three holding sections 11 of the retainer ring 10 securely clamp the bottom wall 231 defining the annular groove 23 of the adaptor 20. Further, the engaging sections 12 engage with the dodecagonal inner periphery of the receiving compartment 31 at six points P. Thus, the adaptor 20 is securely engaged in the receiving compartment 31 of the wrench 30.

Figure 4:
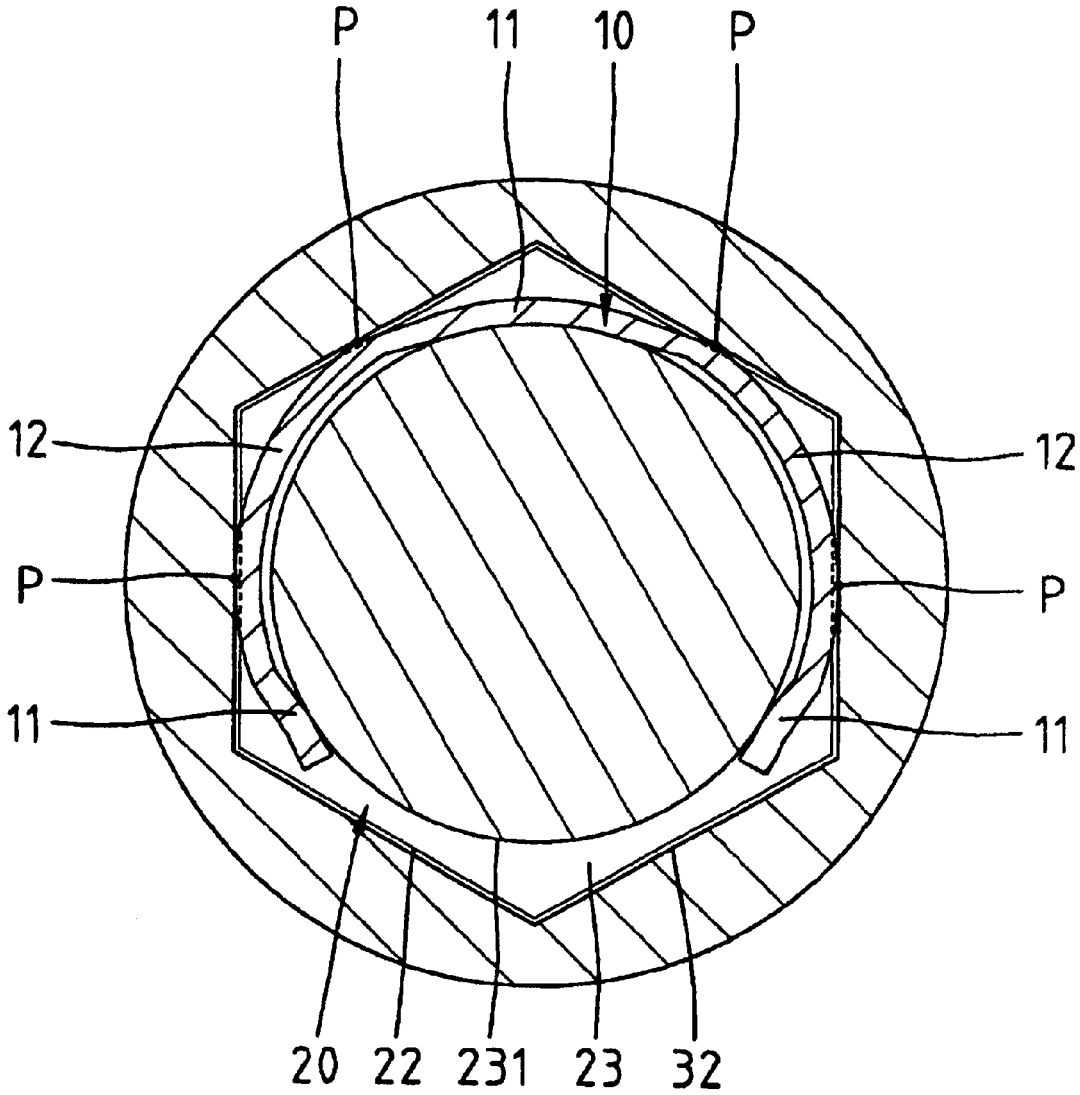
FIG. 4 is a sectional view similar to FIG. 3, illustrating use of the retainer ring with an end of a wrench having a hexagonal inner periphery.

When the adaptor 20 coupled with the retainer ring 10 is mounted in a polygonal receiving compartment 31 of a wrench 30, as illustrated in FIG. 4, the retainer ring 10, when compressed, would not move or wobble in the annular groove 23 of the adaptor 20, as the three holding sections 11 of the retainer ring 10 securely clamp the bottom wall 231 defining the annular groove 23 of the adaptor 20. Further, the engaging sections 12 engage with the hexagonal inner periphery of the receiving compartment 31 at four points P. Thus, the adaptor 20 is securely engaged in the receiving compartment 31 of the wrench 30.

Figure 5:
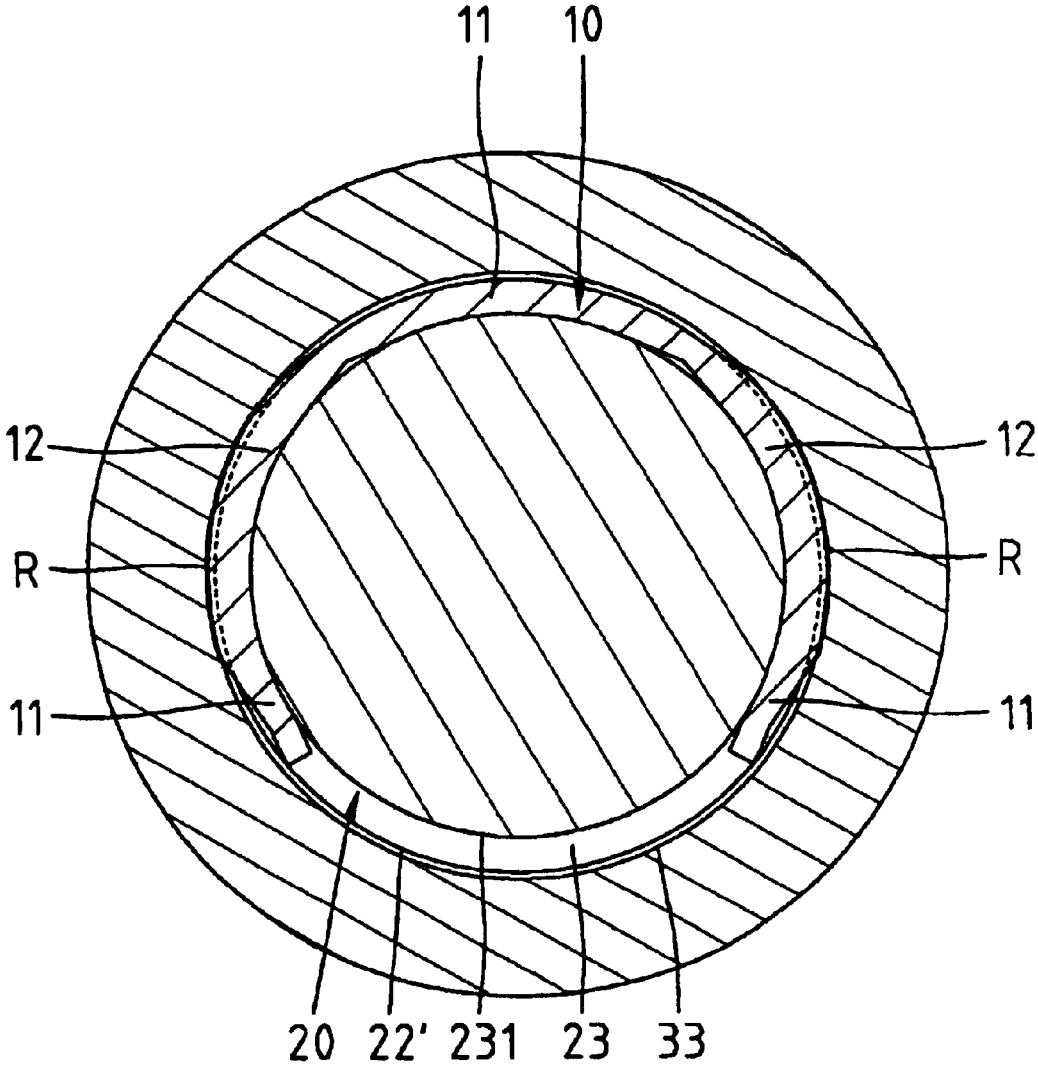
FIG. 5 is a sectional view similar to FIG. 3, illustrating a modified embodiment of the retainer ring in accordance with the present invention.

FIG. 5 illustrates a modified embodiment of the retainer ring 10, wherein like numerals [denotes] *denote* like elements. In this embodiment, the engaging portion (now designated by 22') of the adaptor 20 is circular, and wrench 30 has a circular receiving compartment 33. When [mounting] the adaptor 20 coupled with the retainer ring 10 is mounted in the circular receiving compartment 33 of the wrench 30, as illustrated in FIG. 5, the retainer ring 10, when compressed, would not move or wobble in the annular groove 23 of the adaptor 20, as the three holding sections 11 of the retainer ring 10 securely clamp the bottom wall 231 defining the annular groove 23 of the adaptor 20. Further, the whole engaging sections 12 engage with the circular inner periphery of the receiving compartment 33 (see the solid black lines R in FIG. 5). Thus, the adaptor 20 is securely engaged in the receiving compartment 33 of the wrench 30.

Figure 6:
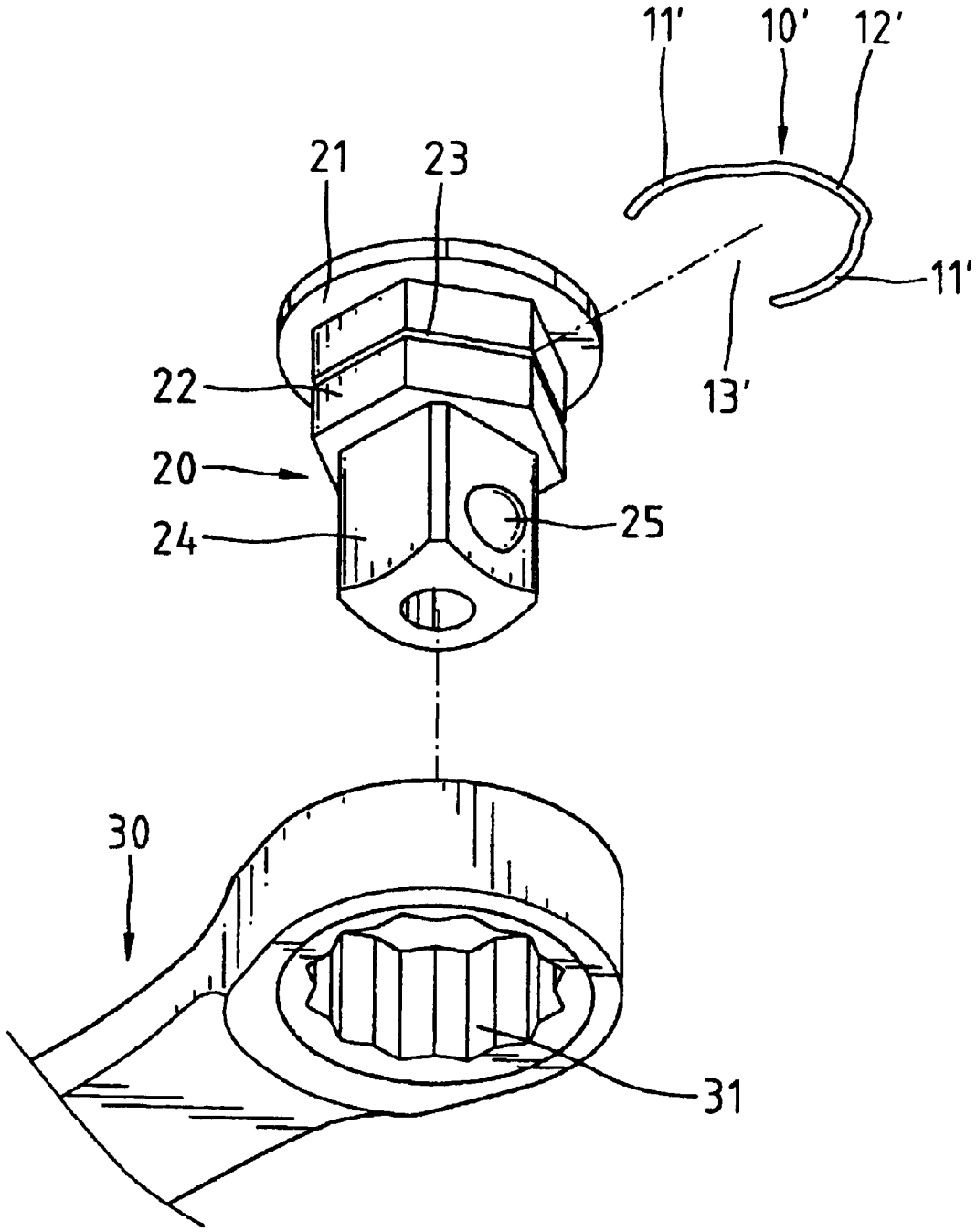
FIG. 6 is an exploded perspective view illustrating a wrench, an adaptor, and another embodiment of the retainer ring in accordance with the present invention.

FIG. 6 illustrates another modified embodiment of the present invention, wherein like numerals [denotes] *denote* like elements. In this embodiment, the retainer ring 10' includes a radially outward engaging section 12' opposite to an opening 13' of the retainer ring 10' and two radially inward holding sections 11'. Each radially inward holding section 11' includes an associated one of the distal ends (not labeled) of the retainer ring 10'. The radii of the holding section 11' and the engaging section 12' in this embodiment are respectively the same as that of the holding section 11 and the engaging section 12 of the embodiment shown in FIG. 1A.

Figure 7:
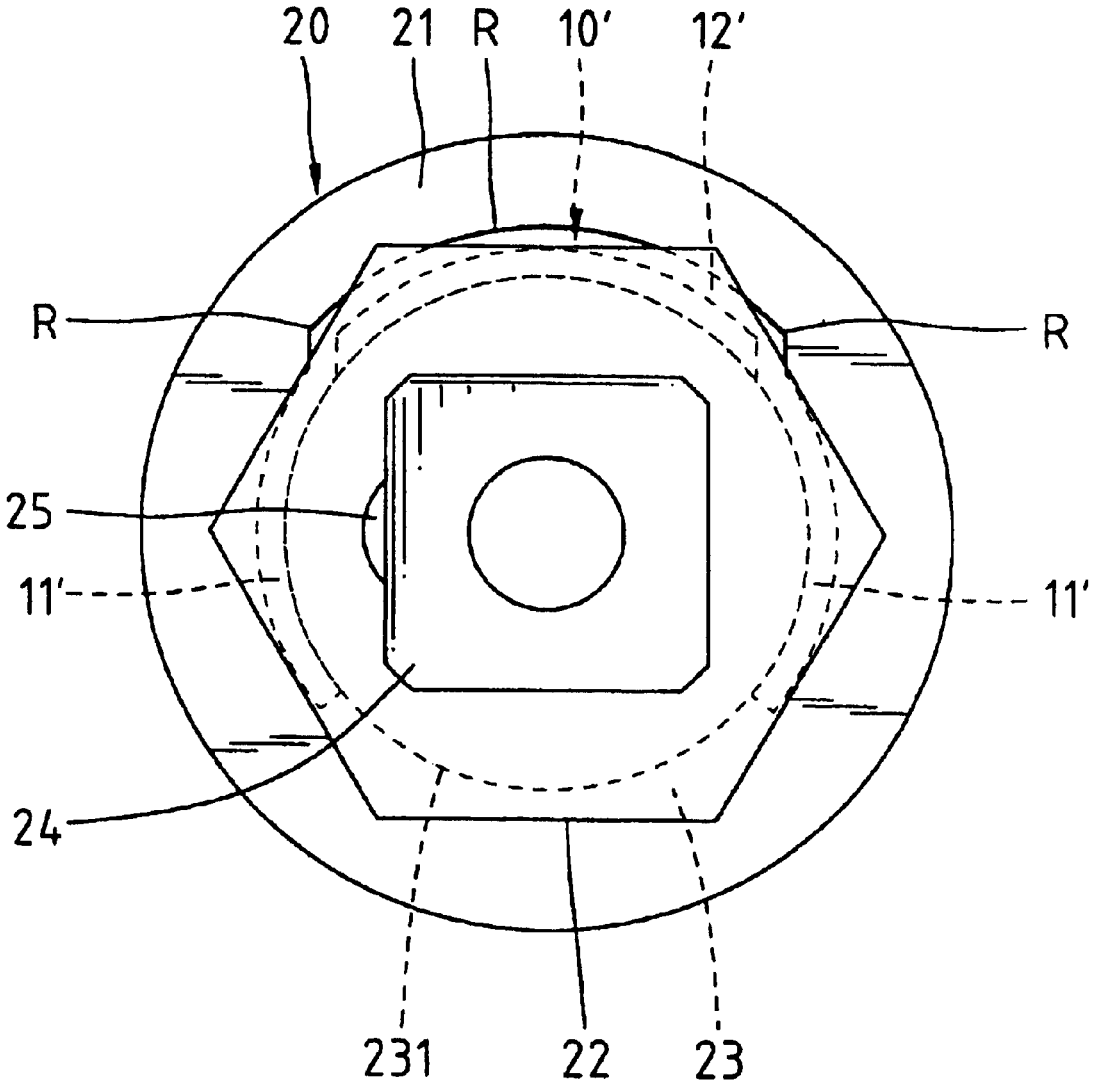
FIG. 7 is a bottom view of the adaptor and the retainer ring of FIG. 6 in an assembled state.

As illustrated in FIG. 7, when mounting the retainer ring 10' to the adaptor 20, the holding sections 11' of the retainer ring 10' securely clamp the bottom wall 231 defining the annular groove 23 of the adaptor 20 without the risk of relative movement therebetween. Further, the engaging section 12' of the retainer ring 10' protrudes beyond the annular groove 23 of the adaptor 20.

Figure 8:
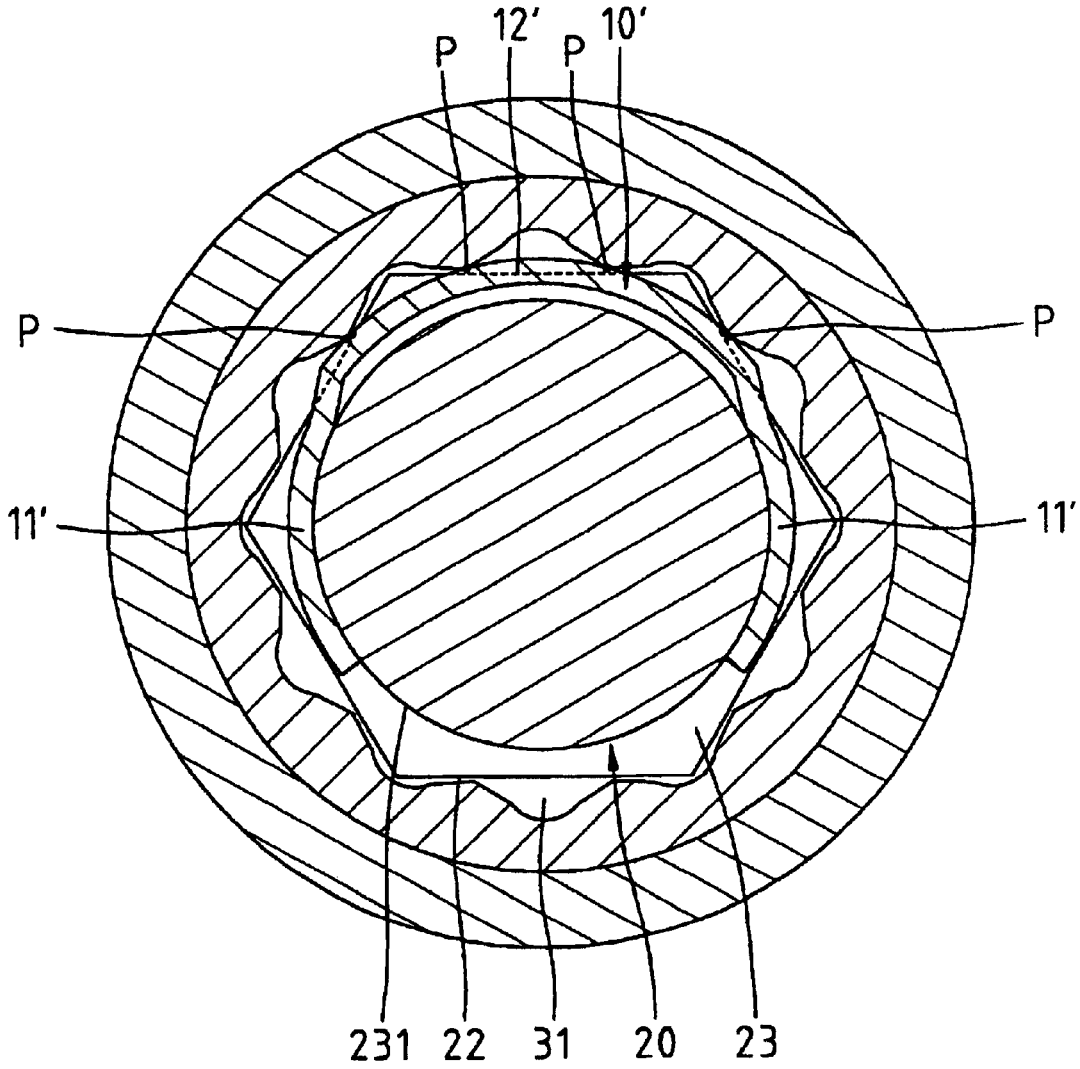
FIG. 8 is a sectional view of the end of the wrench, the adaptor, and the retainer ring in FIG. 7.

When mounting the adaptor 20 coupled with the retainer ring 10' is mounted in a dodecagonal receiving compartment 31 of a wrench 30, as illustrated in FIG. 8, the retainer ring 10', when compressed, would not move or wobble in the annular groove 23 of the adaptor 20, as the holding sections 11' of the retainer ring 10 securely clamp the bottom wall 231 defining the annular groove 23 of the adaptor 20. Further, the engaging section 12' engages with the dodecagonal inner periphery of the receiving compartment 31 at four points P. Thus, the adaptor 20 is securely engaged in the receiving compartment 31 of the wrench 30.

Figure 9:
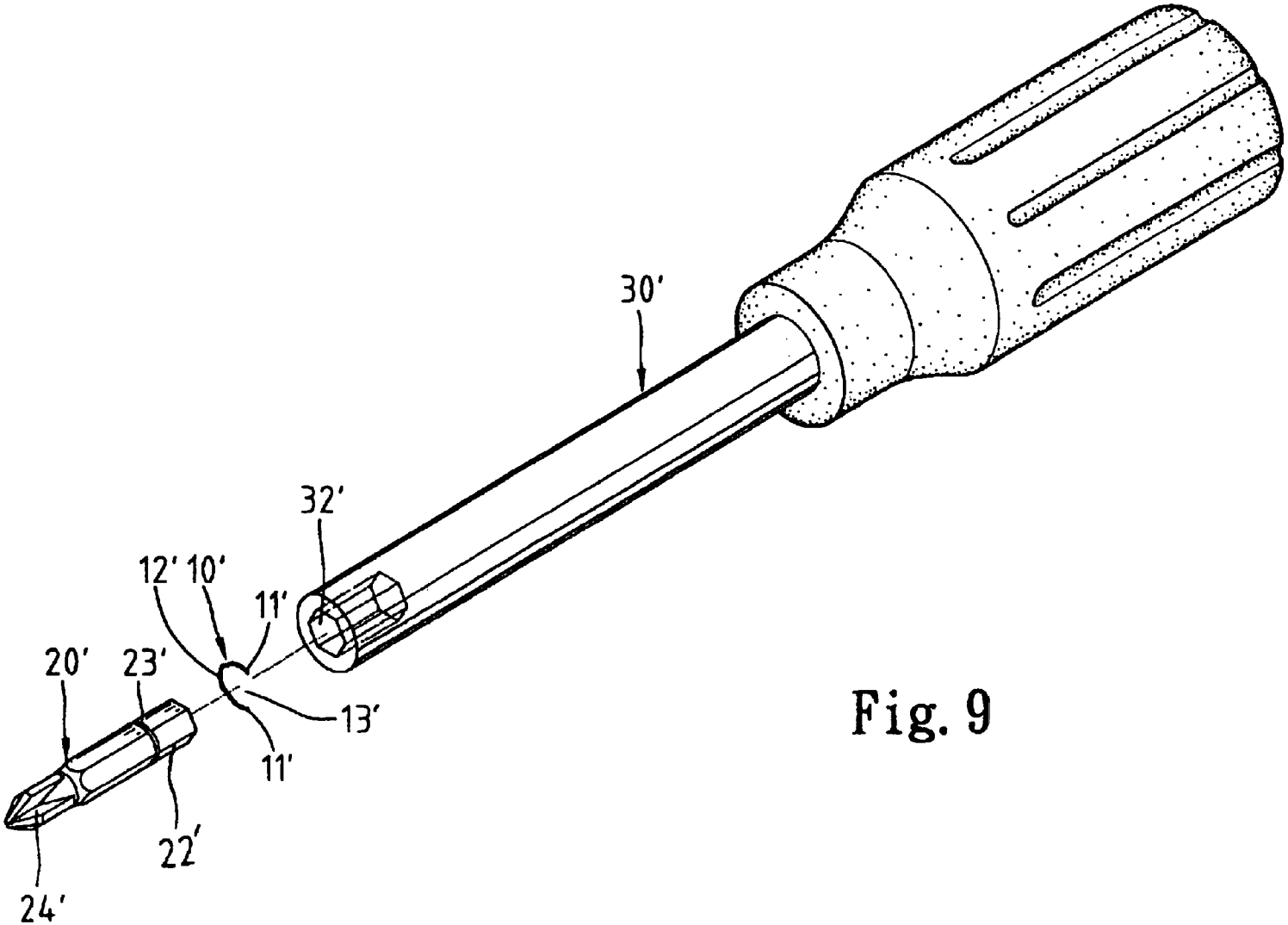
FIG. 9 is an exploded perspective view illustrating a bit, a screwdriver, and another modified embodiment of the retainer ring in accordance with the present invention.

FIG. 9 illustrates a further modified embodiment of the present invention. In this embodiment, the retainer ring 10' includes a radially outward engaging section 12' opposite to an opening 13' of the retainer ring 10' and two radially inward holding sections 11'. Each radially inward holding section 11' includes an associated one of the distal ends (not labeled) of the retainer ring 10'. The retainer ring 10' securely retains a bit 20' to a shank 30' of a screwdriver. An end 22' of the bit 20' is hexagonal and includes a reduced section having an annular groove 23' defined by a bottom wall 231'. A drive end 24' is formed on the other end of the bit 20'. The shank 30' of the screwdriver includes a receiving compartment 32'. The radii of the holding section 11' and the engaging section 12' in this embodiment are respectively the same as that of the holding section 11 and the engaging section 12 of the embodiment shown in FIG. 1A.

Figure 10:
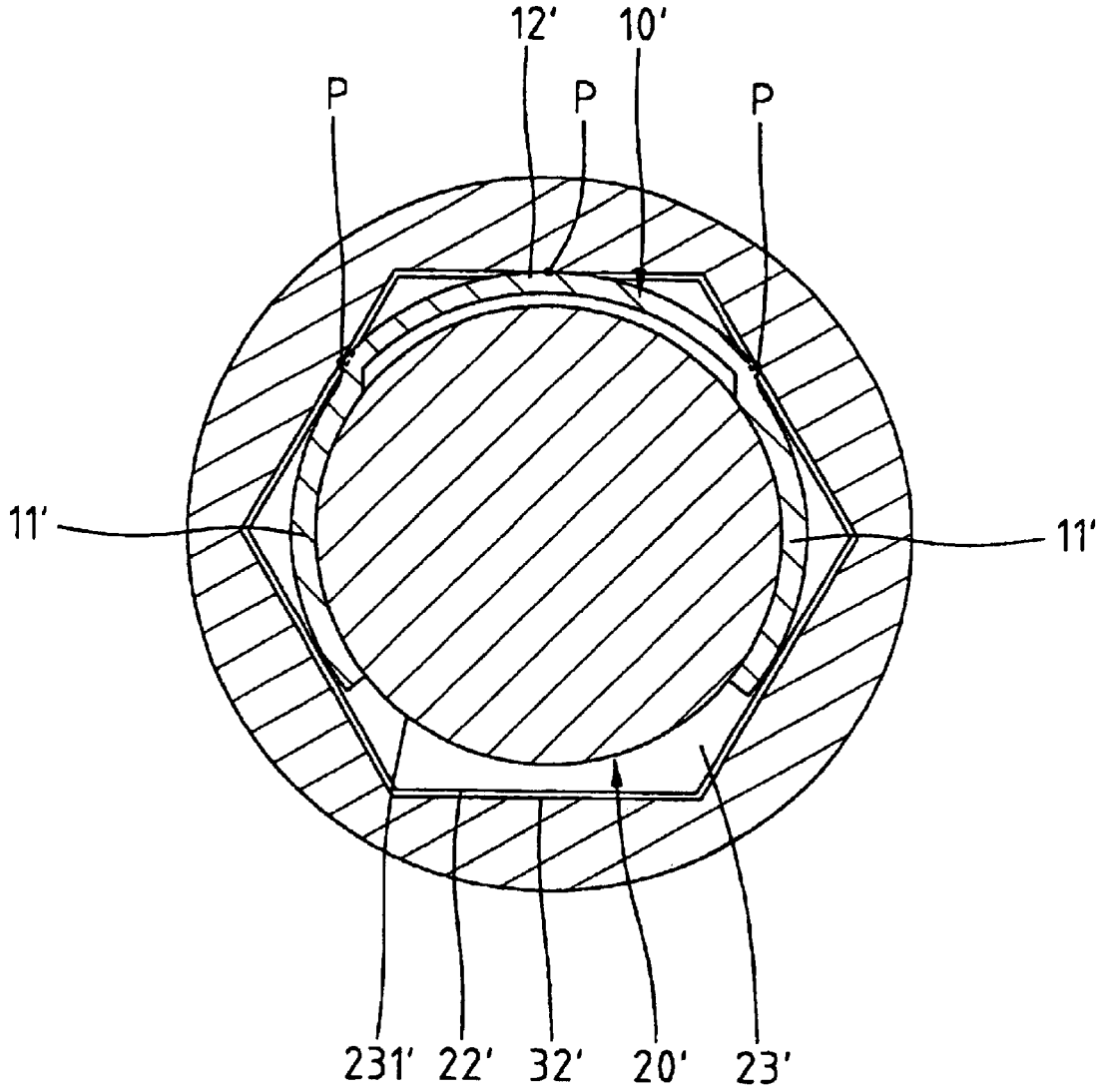
FIG. 10 is a sectional view illustrating engagement between the bit, the screwdriver, and the retainer ring in FIG. 9.

As illustrated in FIG. 10, when mounting the retainer ring 10' to the bit 20', the holding sections 11' of the retainer ring 10' securely clamp the bottom wall 231' defining the annular groove 23' of the bit 20' without the risk of relative movement therebetween. Further, the engaging section 12' of the retainer ring 10' protrudes beyond the annular groove 23' of the bit 20'.

When the bit 20' coupled with the retainer ring 10' is mounted in the hexagonal receiving compartment 32' of the shank 30', as illustrated in FIG. 10, the retainer ring 10', when compressed, would not move or wobble in the annular groove 23' of the bit 20', as the holding sections 11' of the retainer ring 10' securely clamp the bottom wall 231' defining the annul groove 23' of the bit 20'. Further, the engaging section 12' engages with the hexagonal inner periphery of the receiving compartment 32' at three points P. Thus, the bit 20' is securely engaged in the receiving compartment 32' of the shank 30'.

Figure 11:
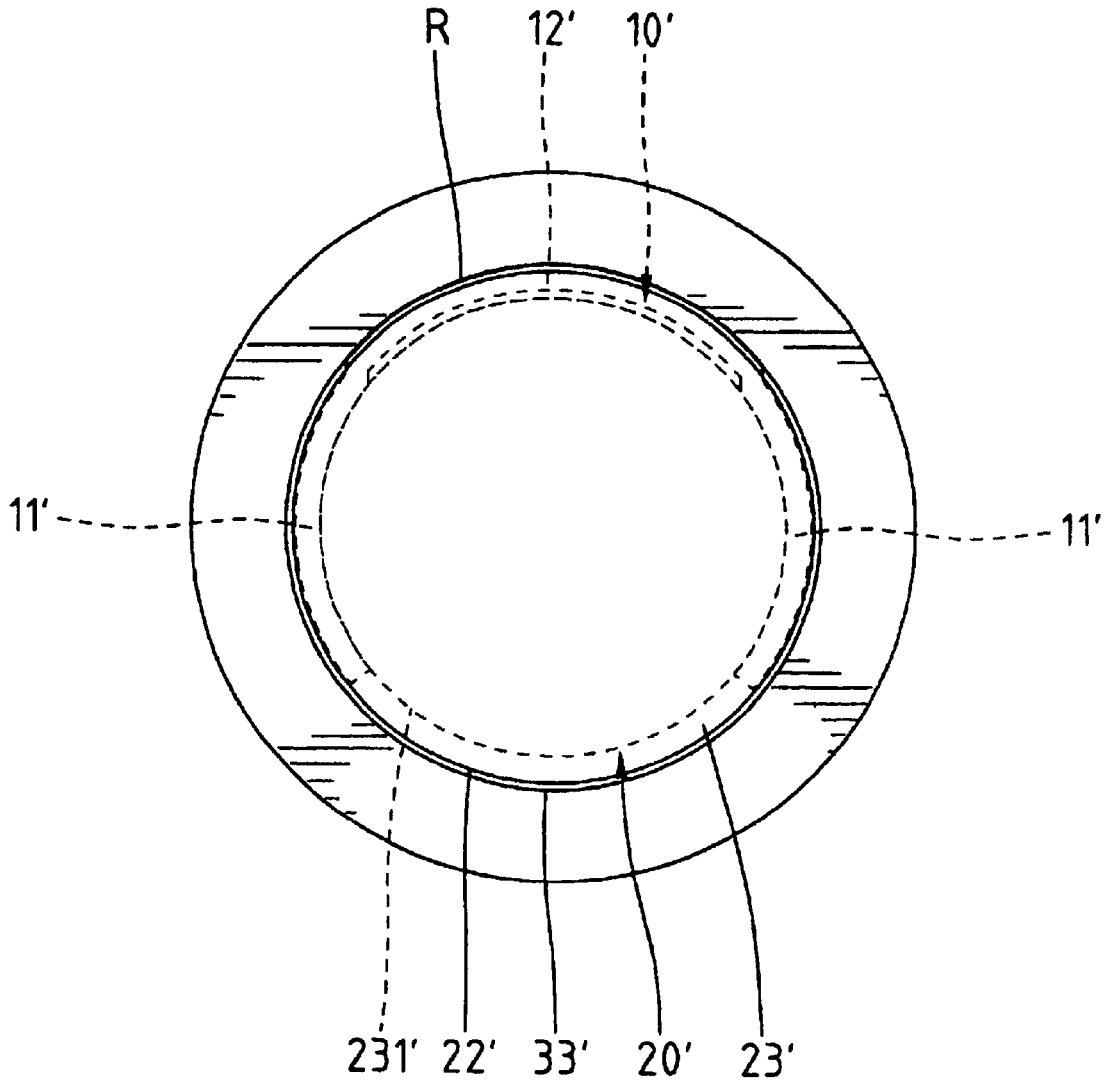
FIG. 11 is a view illustrating use of the retainer ring in a shank having a circular receiving compartment.
Figure 12A:
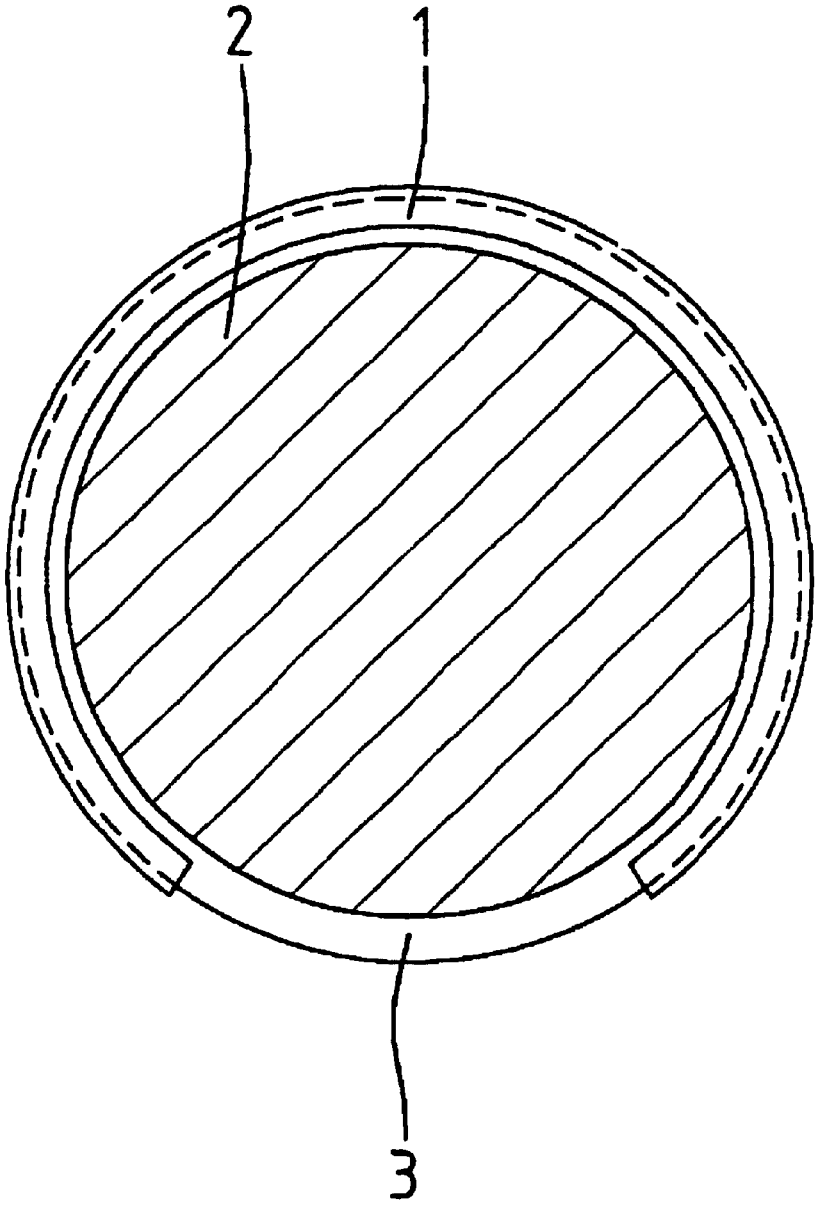
Fig. 12A PRIOR ART
FIG. 12A is a sectional view illustrating engagement between a conventional retainer ring and an adaptor.
Figure 12B:
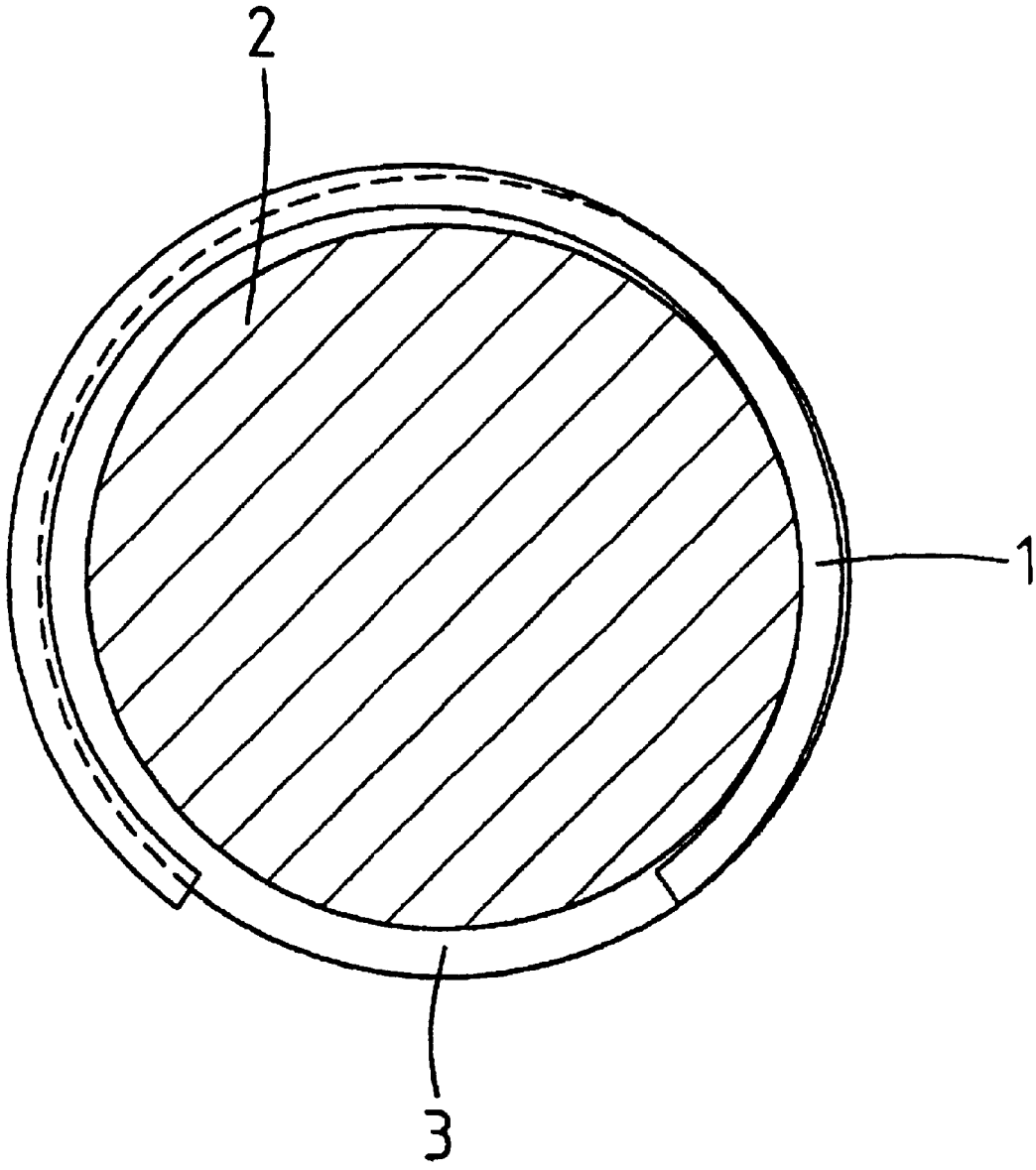
Fig. 12B PRIOR ART
FIG. 12B is a sectional view illustrating anomalous engagement between the retainer ring and the adaptor in FIG. 12A.
Figure 13:
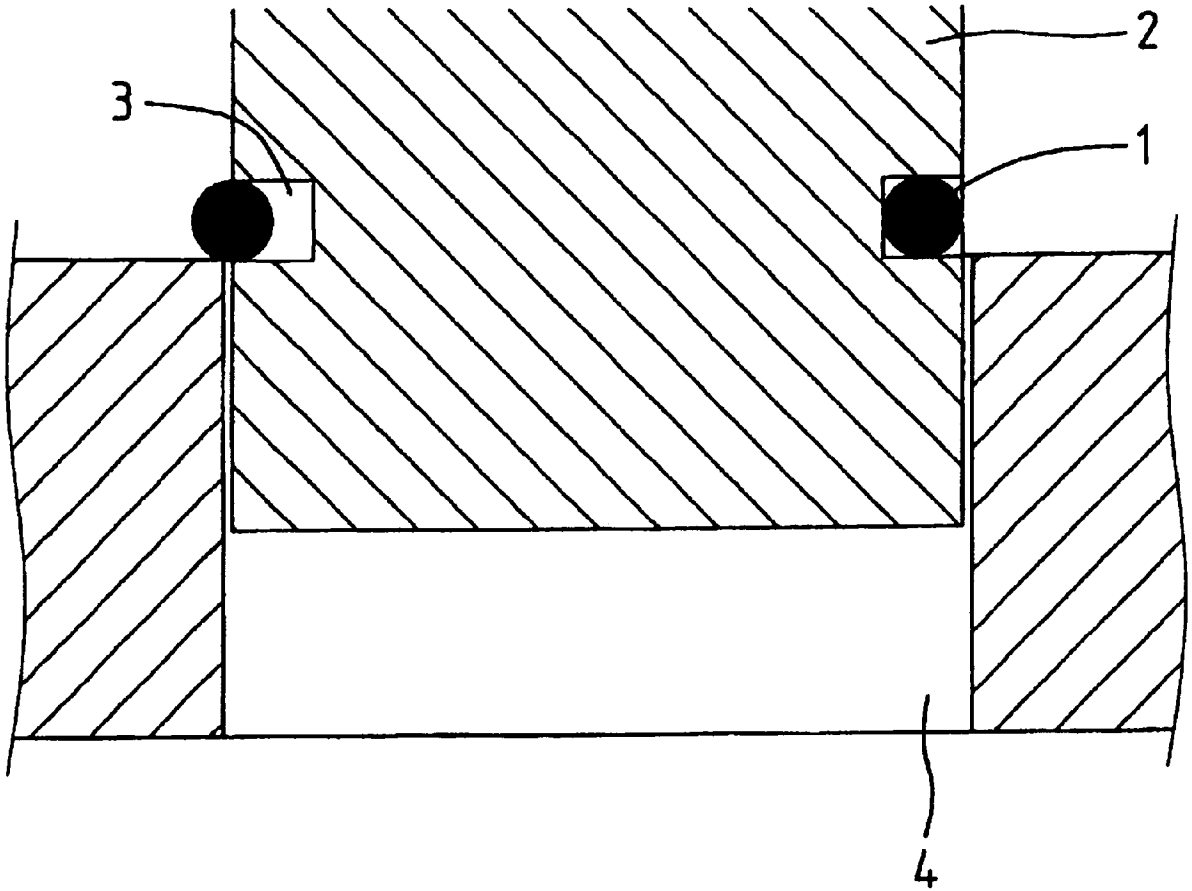
Fig. 13 PRIOR ART
FIG. 13 is a schematic sectional view illustrating difficulty of attaching the adaptor with *the* retainer ring mounted thereon to a wrench.

FIG. 11 illustrates still another modified embodiment that is modified from the embodiment of FIGS. 9 and 10. In this embodiment, the end 22' of the bit 20' is circular and the receiving compartment (now designated by 33') of the shank 30' is also circular. When the bit 20' coupled with the retainer ring 10' is mounted in the circular receiving compartment 33' of the shank 30', as illustrated in FIG. 10, the retainer ring 10' would not move or wobble in [to] *the* annular groove 23' of the bit 20' when compressed, as the holding sections 11' of the retainer ring 10' securely clamp the bottom wall 231' defining the annular groove 23' of the bit 20'. Further, the engaging section 12' engages with the circular inner periphery of the receiving compartment 33' (see the solid black line R). Thus, the bit 20' is securely engaged in the receiving compartment 33' of the shank 30'. The radii of the holding section 11' and the engaging section 12' in this embodiment are respectively the same as that of the holding section 11 and the engaging section 12 of the embodiment shown in FIG. 1A.

It is noted that the [numbers] *number* and the shapes of the holding sections 11, 11' and the engaging sections 12, 12' may vary according to the need.

Although the invention has been explained in relation to its preferred embodiment, it is to be understood that many other possible modifications and variations can be made without departing from the scope of the invention as hereinafter claimed.

What is claimed is:

1. A retainer ring *designed* for [securely] *radially* retaining *an engagement portion of* a first object, having a reduced *portion of a radially reduced cross*-section, [to] *in a receiving compartment of* a second object, the retainer ring *having a substantially uniform radial thickness along the circumference of the retainer ring and* being resilient and comprising:

*a plurality of circumferential sections of said uniform thickness, the circumferential sections including* at least two holding sections and at least one engaging section, *said at least one engaging section defining an outward portion having an outer radius of curvature which is greater than an outer radius of curvature of the holding sections,* each of said at least two holding sections having an inner radius of curvature equal to half of a diameter of the reduced *cross*-section *of the reduced portion* of the first object, said at least one engaging section having an inner radius of curvature *which is* greater than that of said at least two holding sections, *and the curvatures of the holding sections and of the engaging section each having a center of curvature within the circumference of the retainer ring*;

*wherein* said at least two holding sections [being adapted to] *provide for* securely *radially inward* [clamp] *clamping of* said reduced *cross*-section of said first object [with] *and the retainer ring is radially compressible and designed to be radially compressed for radially inward clamping of the holding sections on the reduced cross-section of the reduced portion of the first object when said outward portion of* said at least one engaging section [partially protruding out of said reduced section of said first object for engaging with said second object] *is pressed in a radially inward direction.*

2. The retainer ring as claimed in claim 1, wherein said retainer ring includes two distal ends spaced by an opening, each of said distal ends of said retainer *ring* forming an associated one of said at least two holding sections.

3. The retainer ring as claimed in claim 2, wherein a third holding section of said at least two holding sections of said retainer ring is located in a position opposite to said opening.

4. The retainer ring as claimed in claim 1, wherein said retainer ring includes [an] *a circumferential* opening and wherein said at least one engaging section of said retainer ring is opposite to said opening.

5. The retainer ring as claimed in claim 1, wherein said inner radius of curvature of said at least one engaging section is greater than said inner radius of curvature of said at least two holding sections by an amount less than *said* thickness of said retainer ring.

6. The retainer ring as claimed in claim 2, wherein said inner radius of curvature of said at least one engaging section is greater than said inner radius of curvature of said at least two holding sections by an amount less than [a] *said* thickness of said retainer ring.

7. The retainer ring as claimed in claim 3, wherein said inner radius of curvature of said at least one engaging section is greater than said inner radius of curvature of said at least two holding sections by an amount less than [a a] *said* thickness of said retainer ring.

8. The retainer ring as claimed in claim 4, wherein said inner radius of curvature of said at least one engaging section is greater than said inner radius of curvature of said at least two holding sections by an amount less than [a a] *said* thickness of said retainer ring.

9. A combination comprising:

a first object *that* [including] *includes an engagement portion and* a reduced *portion of a radially reduced cross*-section *formed in the engagement portion*;

a second object *that* [including] *includes* a receiving compartment; and a resilient retainer ring *designed for radially retaining the engagement portion of the first object in the receiving compartment of the second object, the retainer ring having a substantially uniform radial thickness along the circumference thereof and comprising a plurality of circumferential sections of said uniform thickness, the circumferential sections* including at least two holding sections and at least one engaging section, *said at least one engaging section defining an outward portion having an outer radius of curvature that is greater than an outer radius of curvature of the holding sections,* each of said at least two holding sections having an inner radius of curvature equal to half of a diameter of said reduced *cross*-section of said *reduced portion of the engagement portion of the* first object, said at least one engaging section having an inner radius of curvature greater than that of said at least two holding sections, *the curvatures of the holding sections and of the engaging section each having a center of curvature within the circumference of the retainer ring*,

[said at least two holding sections securely clamping said reduced section of said first object with] *wherein the retainer ring, when mounted on the reduced cross-section of the engagement portion of the first object and when the engagement portion of the first object is received in the receiving compartment of the second object, has* said *outward portion of said* at least one engaging section [partially] protruding out of said reduced [section] *portion* of said [first object for] *engagement portion beyond an outer periphery thereof and said outward portion is radially* [engaging] *engaged* with an inner periphery of said receiving compartment of said second object[, with engagement of the at least one engaging section with the second object providing for clamping of the at least two holding sections], *so that the retainer ring is radially compressed and the at least two holding sections are securely clamped* about the reduced *cross*-section *of the reduced portion of the engagement portion*.

10. The combination as claimed in claim 9, wherein said retainer ring includes two distal ends spaced by an opening, each of said distal ends of said retainer *ring* forming an associated one of said at least two holding sections.

11. The combination as claimed in claim 10, wherein a third holding section of said at least two holding sections is opposite to said opening.

12. The combination as claimed in claim 9, wherein said retainer ring includes [an] *a circumferential* opening and wherein said at least one engaging section of said retainer ring is opposite to said opening.

13. The combination as claimed in claim 9, wherein the first object is an adaptor and the second object is a box end of a wrench.

14. The combination as claimed in claim 9, wherein the first object is a bit and the second object is a shank of a screwdriver.

15. The combination as claimed in claim 9, wherein said inner radius of curvature of said at least one engaging section is greater than said inner radius of curvature of said at least two holding sections by an amount less than [a a] *said* thickness of said retainer ring.

16. The combination as claimed in claim 10, wherein said inner radius of curvature of said at least one engaging section is greater than said inner radius of curvature of said at least two holding sections by an amount less than [a] *said* thickness of said retainer ring.

17. The combination as claimed in claim 11, wherein said inner radius of curvature of said at least one engaging section is greater than said inner radius of curvature of said at least two holding sections by an amount less than [a] *said* thickness of said retainer ring.

18. The combination as claimed in claim 12, wherein said inner radius of curvature of said at least one engaging section is greater than said inner radius of curvature of said at least two holding sections by an amount less than [a] *said* thickness of said retainer ring.

19. The combination as claimed in claim 13, wherein said inner radius of curvature of said at least one engaging section is greater than said inner radius of curvature of said at least two holding sections by an amount less than [a] *said* thickness of said retainer ring.

20. The combination as claimed in claim 14, wherein said inner radius of curvature of said at least one engaging section is greater than said inner radius of curvature of said at least two holding sections by an amount less than [a] *said* thickness of said retainer ring.

*21. The retainer ring as claimed in claim 3, wherein said at least one engaging section comprises a first engaging section and a second engaging section, the first engaging section between the third holding section and one of said distal ends of the retainer ring and the second engaging section between the third holding section and the other of said distal ends.*

*22. The retainer ring as claimed in claim 21, wherein the inner radius of curvature of said at least one engaging section is constant along a circumferential length of the engaging section.*

*23. The retainer ring as claimed in claim 4, wherein the retainer ring includes two distal ends spaced by said opening, and one of said at least two holding sections extends between said at least one engaging section and one of said distal ends, and the other of said at least two holding sections extends between said at least one engaging section and the other of said distal ends.*

*24. The retainer ring as claimed in claim 23, wherein the inner radius of curvature of said at least one engaging section is constant along a circumferential length of the engaging section.*

*25. The retainer ring as claimed in claim 11, wherein said at least one engaging section comprises a first engaging section and a second engaging section, the first engaging section extending between the third holding section and one of said distal ends of the retainer ring and the second engaging section extending between the third holding section and the other of said distal ends.*

*26. The retainer ring as claimed in claim 25, wherein the inner radius of curvature of said at least one engaging section is constant along a circumferential length of the engaging section.*

*27. The retainer ring as claimed in claim 12, wherein the retainer ring includes two distal ends spaced by said opening, and one of said at least two holding sections extends between said at least one engaging section and one of said distal ends, and the other of said at least two holding sections extends between said at least one engaging section and the other of said distal ends.*

*28. The retainer ring as claimed in claim 27, wherein the inner radius of curvature of said at least one engaging section is constant along a circumferential length of the engaging section.*

*29. The retainer ring as claimed in claim 28, wherein the first and second holding sections have an inner radius of curvature equal to half of a diameter of the reduced cross-section of the first object along a circumferential length of the holding sections.*

*30. A retainer ring for radially retaining an engagement portion of a first object, including a reduced portion of a radially reduced cross-section, in a receiving compartment of a second object, the retainer ring having a substantially uniform radial thickness along the circumference of the retainer ring and being resilient and comprising:*

*a plurality of circumferential sections of said uniform thickness, the circumferential sections including first and second holding sections and a first engaging section, the first engaging section having an inner radius of curvature that is greater than an inner radius of curvature of the first and second holding sections, and the first engaging section defining outward portions having an outer radius of curvature which is greater than an outer radius of curvature of said first and second holding sections, the curvatures of the first engaging section and of the outward portions thereof each having a center of curvature within the circumference of the retainer ring, said retainer ring further including first and second distal ends spaced by an opening;*

*wherein said first and second holding sections provide for securely radially inward clamping of said reduced cross-section of the reduced portion of said first object, and the retainer ring is radially compressible and designed to be radially compressed for radially inward clamping of the first and second holding sections on the reduced cross-section of the reduced portion of the first object when said outward portions of the first engaging section are pressed in a radially inward direction.*

*31. The retainer ring as claimed in claim 30, the first and second distal ends of said retainer ring forming respectively the first and second holding sections.*

*32. The retainer ring as claimed in claim 31, further comprising a third holding section located in a position opposite to said opening.*

*33. The retainer ring as claimed in claim 32, wherein said first engaging section protrudes radially outward from said at least one of said first and second holding sections by a distance less than said thickness of said retainer ring.*

*34. The retainer ring as claimed in claim 31, wherein said first engaging section protrudes radially outward from said at least one of said first and second holding sections by a distance less than said thickness of said retainer ring.*

*35. The retainer ring as claimed in claim 30, wherein said first engaging section of said retainer ring is opposite to said opening.*

*36. The retainer ring as claimed in claim 35, wherein said first engaging section protrudes radially outward from said at least one of said first and second holding sections by a distance less than said thickness of said retainer ring.*

*37. The retainer ring as claimed in claim 30, wherein said first engaging section protrudes radially outward from said*

*at least one of said first and second holding sections by a distance less than said thickness of said retainer ring.*

*38. The retainer ring as claimed in claim 30, wherein the first object is a bit and the second object is a shank of a screwdriver.*

*39. The retainer ring as claimed in claim 30, wherein the first object is an adaptor and the second object is a box end of a wrench.*

*40. The retainer ring as claimed in claim 30, further comprising a third holding section and a second engaging section, the first engaging section between the third holding section and one of said distal ends of the retainer ring and the second engaging section between the third holding section and the other of said distal ends.*

*41. The retainer ring as claimed in claim 40, wherein the inner radius of curvature of the first engaging section is constant along a circumferential length of the engagement section.*

*42. The retainer ring as claimed in claim 30, wherein the first holding section extends between said first engaging section and one of said distal ends, and the second holding sections extends between said first engaging section and the other of said distal ends.*

*43. The retainer ring as claimed in claim 42, wherein the inner radius of curvature of the first engaging section is constant along a circumferential length of the engagement section.*

*44. A combination comprising:*

*a first object that includes an engagement portion and a reduced portion of a radially reduced cross-section formed into the engagement portion;*

*a second object that includes a receiving compartment; and*

*a resilient retainer ring designed for radially retaining the engagement portion of the first object in the receiving compartment of the second object, the retainer ring having a substantially uniform radial thickness along the circumference thereof and comprising a plurality of circumferential sections of said uniform thickness, the circumferential sections including first and second holding sections and a first engaging section, the first engaging section having an inner radius of curvature which is greater than an inner radius of curvature of the first and second holding sections, and the first engaging section defining outward portions having an outer radius of curvature which is greater than an outer radius of curvature of the first and second holding sections, the curvatures of the first engaging section each having a center of curvature within the circumference of the retainer ring;*

*said retainer ring including first and second distal ends spaced by an opening, said first and second distal ends of said retainer ring forming respectively said first holding section and said second holding section;*

*wherein the retainer ring, when mounted on the reduced portion of the engagement portion of the first object, and when the engagement portion of the first object is received in the receiving compartment of the second object, has the outward portions of said first engaging section protruding out of said reduced portion of said engagement portion beyond an outer periphery thereof and the outward portions are radially engaged by an inner periphery of said receiving compartment of said second object, so that the retainer ring is radially compressed and the first and second holding sections are radially inwardly clamped about the reduced cross-section of said reduced portion.*

*45. The combination as claimed in claim 44, further comprising a third holding section opposite to said opening.*

*46. The combination as claimed in claim 45, wherein said first engaging section protrudes radially outward from said at least one of said first and second holding sections by a distance less than said thickness of said retainer ring.*

*47. The combination as claimed in claim 44, wherein said first engaging section of said retainer ring is opposite to said opening.*

*48. The combination as claimed in claim 47, wherein said first engaging section protrudes radially outward from said at least one of said first and second holding sections by a distance less than said thickness of said retainer ring.*

*49. The combination as claimed in claim 44, wherein the first object is an adaptor and the second object is a box end of a wrench.*

*50. The combination as claimed in claim 49, wherein said first engaging section protrudes radially outward from said at least one of said first and second holding sections by a distance less than said thickness of said retainer ring.*

*51. The combination as claimed in claim 44, wherein the first object is a bit and the second object is a shank of a screwdriver.*

*52. The combination as claimed in claim 51, wherein said first engaging section protrudes radially outward from said at least one of said first and second holding sections by a distance less than said thickness of said retainer ring.*

*53. The combination as claimed in claim 44, wherein said first engaging section protrudes radially outward from said at least one of said first and second holding sections by a distance less than said thickness of said retainer ring.*

*54. The combination as claimed in claim 49, wherein the adaptor comprises a polygonal engaging portion including an annular groove.*

*55. The combination as claimed in claim 54, wherein the adaptor comprises a drive end adapted for driving a socket.*

*56. The combination as claimed in claim 55, wherein the box end of the wrench comprises a polygonal receiving compartment.*

*57. The combination as claimed in claim 55, wherein the box end of the wrench comprises a dodecagonal inner periphery.*

*58. The combination as claimed in claim 49, wherein the box end of the wrench comprises a polygonal receiving compartment.*

*59. The combination as claimed in claim 49, wherein the box end of the wrench comprises a dodecagonal inner periphery.*

*60. The retainer ring as claimed in claim 44, further comprising a third holding section and a second engaging section, the first engaging section between the third holding section and one of said distal ends of the retainer ring and the second engaging section between the third holding section and the other of said distal ends.*

*61. The retainer ring as claimed in claim 60, wherein the inner radius of curvature of the first engaging section is constant along a circumferential length of the engagement section.*

*62. The retainer ring as claimed in claim 44, wherein the first holding section extends between said first engaging section and one of said distal ends, and the second holding sections extends between said first engaging section and the other of said distal ends.*

*63. The retainer ring as claimed in claim 62, wherein the inner radius of curvature of the first engaging section is constant along a circumferential length of the engagement section.*

*64. The retainer ring as claimed in claim 62, wherein the first and second holding sections have an inner radius of curvature equal to half of a diameter of the reduced cross-section of the first object along a circumferential length of the holding sections.*

*65. A combination comprising:*

*an adaptor that includes an engagement portion and a reduced portion of a radially reduced cross-section formed into the engagement portion;*

*a box end of a wrench that includes a receiving compartment; and*

*a resilient retainer ring designed for radially retaining the engagement portion of the adaptor in the receiving compartment of the box end of the wrench, the retainer ring having a substantially uniform radial thickness along the circumference thereof and comprising a plurality of circumferential sections of said uniform thickness, the circumferential sections including first, second, and third holding sections and further including first and second engaging sections, the first engaging section having an inner radius of curvature greater than an inner radius of curvature of each of the holding sections and defining a first outward portion having an outer radius of curvature that is greater than an outer radius of curvature of each of the holding sections, the curvatures of the first engaging section and of said first outward portion each having a center of curvature within the circumference of the retainer ring, the second engaging section defining a second outward portion having an outer radius of curvature which is greater than an outer radius of curvature of each of the holding sections;*

*said retainer ring further including first and second distal ends spaced by an opening, said third holding section being opposite to said opening, the first engaging section extending between the first holding section and the third holding section, and the second engaging section extending between the second holding section and the third holding section; wherein the retainer ring, when mounted on the reduced portion of the engagement portion of the adaptor, has said first, second and third holding sections securely clamping radially on said reduced portion of said engagement portion and has said outward portions of said first and second engaging sections protruding out of said reduced portion of said engagement portion beyond an outer periphery thereof, and said outward portions radially engage with an inner periphery of said receiving compartment of said box end, when the engagement portion is received in the receiving compartment of said box end of a wrench, so that the retainer ring is radially compressed and the first, second and third holding sections are radially inwardly clamped about the reduced portion of the engagement portion.*

*66. The combination as claimed in claim 65, wherein the adaptor comprises a polygonal engaging portion including an annular groove.*

*67. The combination as claimed in claim 66, wherein the adaptor comprises a drive end adapted for driving a socket.*

*68. The combination as claimed in claim 66, wherein the box end of the wrench comprises a receiving compartment having a hexagonal inner periphery, and wherein the outward portions of the first and second engaging sections of the retainer ring engage with the hexagonal inner periphery of the receiving compartment at four points.*

*69. The combination as claimed in claim 68, wherein said first engaging section protrudes radially outward from said first and second holding sections by a distance less than said thickness of said retainer ring.*

*70. The combination as claimed in claim 69, wherein said second engaging section protrudes radially outward from said second and third holding sections by a distance less than said thickness of said retainer ring.*

*71. The combination as claimed in claim 68, wherein said second engaging section protrudes radially outward from said second and third holding sections by a distance less than said thickness of said retainer ring.*

*72. The combination as claimed in claim 66, wherein the box end of the wrench comprises a dodecagonal inner periphery and wherein the outward portions of the first and second engaging sections of the retainer ring engage with the dodecagonal inner periphery at six points.*

*73. The combination as claimed in claim 72, wherein said first engaging section protrudes radially outward from said first and second holding sections by a distance less than said thickness of said retainer ring.*

*74. The combination as claimed in claim 73, wherein said second engaging section protrudes radially outward from said second and third holding sections by a distance less than said thickness of said retainer ring.*

*75. The combination as claimed in claim 72, wherein said second engaging section protrudes radially outward from said second and third holding sections by a distance less than said thickness of said retainer ring.*

*76. The combination as claimed in claim 65, wherein said first engaging section protrudes radially outward from said first and second holding sections by a distance less than said thickness of said retainer ring.*

*77. The combination as claimed in claim 76, wherein said second engaging section protrudes radially outward from said second and third holding sections by a distance less than said thickness of said retainer ring.*

*78. The combination as claimed in claim 66, wherein said second engaging section protrudes radially outward from said second and third holding sections by a distance less than said thickness of said retainer ring.*

*79. A combination of a first object and a radially resilient retainer ring, the retainer ring mounted on a reduced portion of an engagement portion and designed for radially retaining the engagement portion in a receiving compartment of a second object,*

*the first object including the engagement portion and the reduced portion of the engagement portion is formed into the engagement portion to have a radially reduced cross-section,*

*the retainer ring including two distal ends spaced by an opening and having a substantially uniform radial thickness along the circumferential length thereof,*

*the retainer ring further including a plurality of circumferential sections of said uniform thickness, the circumferential sections including first and second holding sections and a first engaging section, the first and second holding sections having an inner radius of curvature that is equal to half of a diameter of the cross-section of the reduced portion of said engagement portion, and the first engaging section having an inner radius of curvature that is greater than said inner radius of curvature of the holding sections, the first engaging section defining an outward portion that protrudes outwardly beyond a periphery of the engagement portion and has an outer radius of curvature that is greater than an outer radius of curvature of the holding sections, each of said curvatures having a center of curvature inside the periphery of the retainer ring,*

*wherein the reduced portion of said engagement portion is radially clamped by the holding sections and the retainer ring is radially compressible and is designed to be compressed for radially inward clamping of the holding sections onto the reduced section when the outward portion of the engaging section is pressed in a radially inward direction of the retainer ring.*

*80. The combination as claimed in claim 79, wherein the first holding section includes one of said distal ends of the retainer ring, and the second holding section includes the other of the distal ends of the retainer ring.*

*81. The combination as claimed in claim 79, wherein the circumferential sections of the retainer ring further include a second engaging section defining an outward portion protruding outwardly beyond the periphery of the engagement portion of the first object and having an outer radius of curvature that is greater than an outer radius of curvature of each of the holding sections, wherein the curvature has a center of curvature within the periphery of the retainer ring.*

*82. The combination as claimed in claim 81, wherein the inner radius of curvature of the first engaging section and an inner radius of curvature of the second engaging section each is greater than the inner radius of curvature of the first and second holding sections by an amount less than said thickness of the retainer ring.*

*83. The combination as claimed in claim 79, wherein an inner radius of curvature along circumferential lengths of the holding sections is defined by said inner radius of curvature of the first and second holding sections.*

*84. The combination as claimed in claim 79, wherein the inner radius of curvature of the first engaging section is greater than the inner radius of curvature of the first and second holding sections by an amount less than said thickness of the retainer ring.*

*85. The combination as claimed in claim 79, wherein the periphery of the engagement portion of the first object is hexagonal, and an outward portion is defined by each of two circumferential ends of said first engaging section and protrudes outwardly beyond the periphery of the engagement portion and has an outer radius of curvature greater than an outer radius of curvature of the holding sections.*

*86. The combination as claimed in claim 79, wherein the first engaging section is opposite to said opening, and the first holding section extends between the first engaging section and one of said distal ends of the retainer ring, and the second holding section extends between the first engaging section and the other of said distal ends of the retainer ring.*

*87. The combination as claimed in claim 86, wherein the inner radius of curvature of the first engaging section is constant along a circumferential length of the engaging section.*

*88. The combination as claimed in claim 87, wherein the inner radius of curvature of the first engaging section is greater than the inner radius of curvature of the first and second holding sections by an amount less than said thickness of the retainer ring.*

*89. The combination as claimed in claim 86, wherein the periphery of the engagement portion of the first object is hexagonal, and an outward portion is defined by each of two circumferential ends of said first engaging section and protrudes outwardly beyond the periphery of the engagement portion and has an outer radius of curvature greater than an outer radius of curvature of the holding sections.*

*90. The combination as claimed in claim 79, wherein the circumferential sections of the retainer ring further include a third holding section and a second engaging section, the third holding section being opposite to said opening, the first engaging section extending between the first holding section and the third holding section, and the second engaging section extending between the second holding section and the third holding section.*

*91. The combination as claimed in claim 90, wherein the first and second engaging sections each have an inner radius of curvature that is constant along a circumferential length of the engaging section.*

*92. The combination as claimed in claim 90, wherein the third holding section has an inner radius of curvature that is equal to half of a diameter of the reduced portion of the engagement portion of the first object.*

*93. The combination as claimed in claim 90, wherein the inner radius of curvature of the first and second engaging section is greater than an inner radius of curvature of the third holding section by an amount less than said thickness of the retainer ring.*

*94. The combination as claimed in claim 90, wherein the periphery of the engagement portion of the first object is hexagonal and an outward portion protruding outwardly beyond the periphery of the engagement portion and having an outer radius of curvature greater than an outer radius of curvature of each of the holding sections is defined by each of two circumferential ends of each of the first and second engaging sections.*

* * * * *